May 5, 1925.

F. CREEDY 1,536,077

DYNAMO ELECTRIC MACHINE

Filed July 30, 1921

2 Pole.

8 Pole.

8 Pole.

INVENTOR.
Frederick Creedy.
by A. E. O'Dell
Attorney.

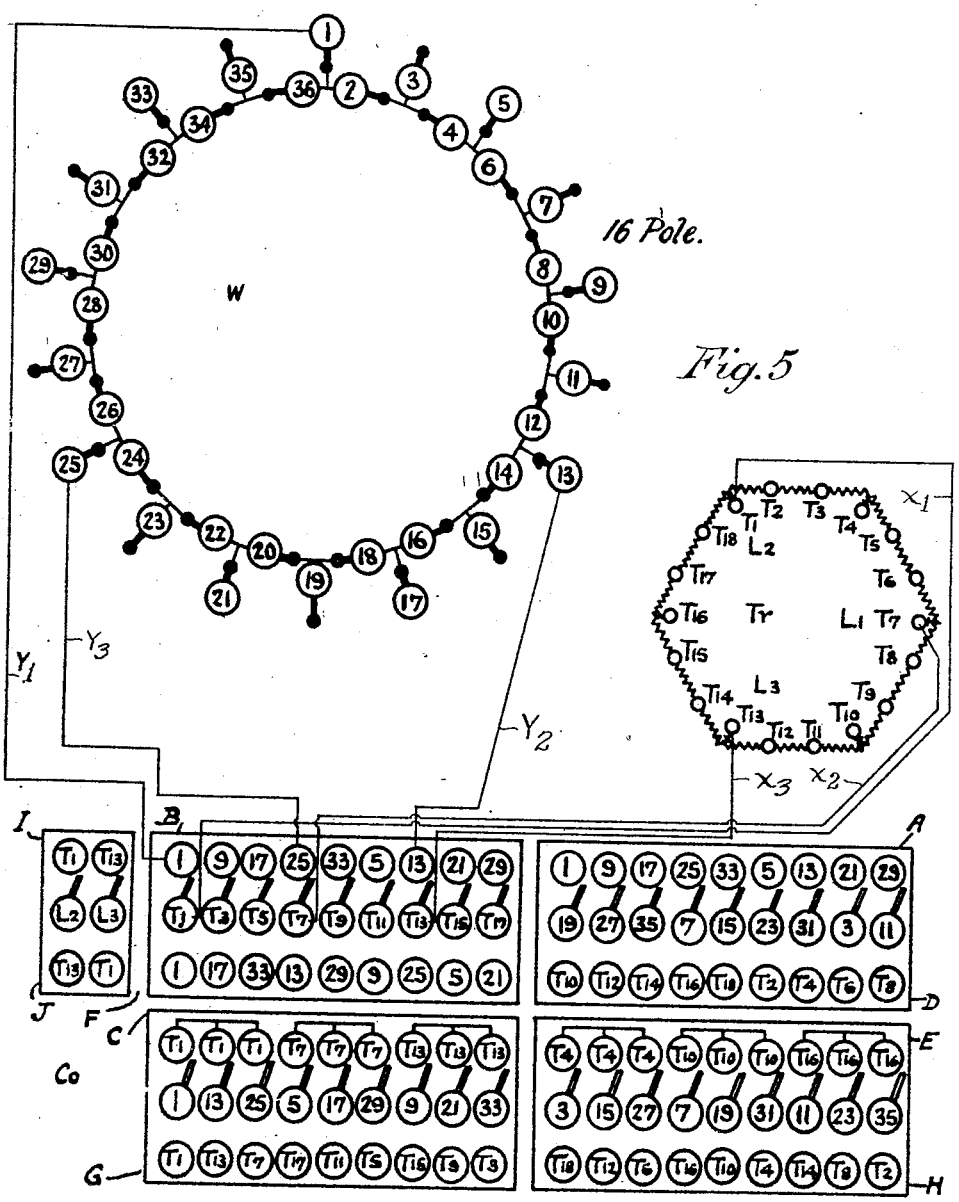

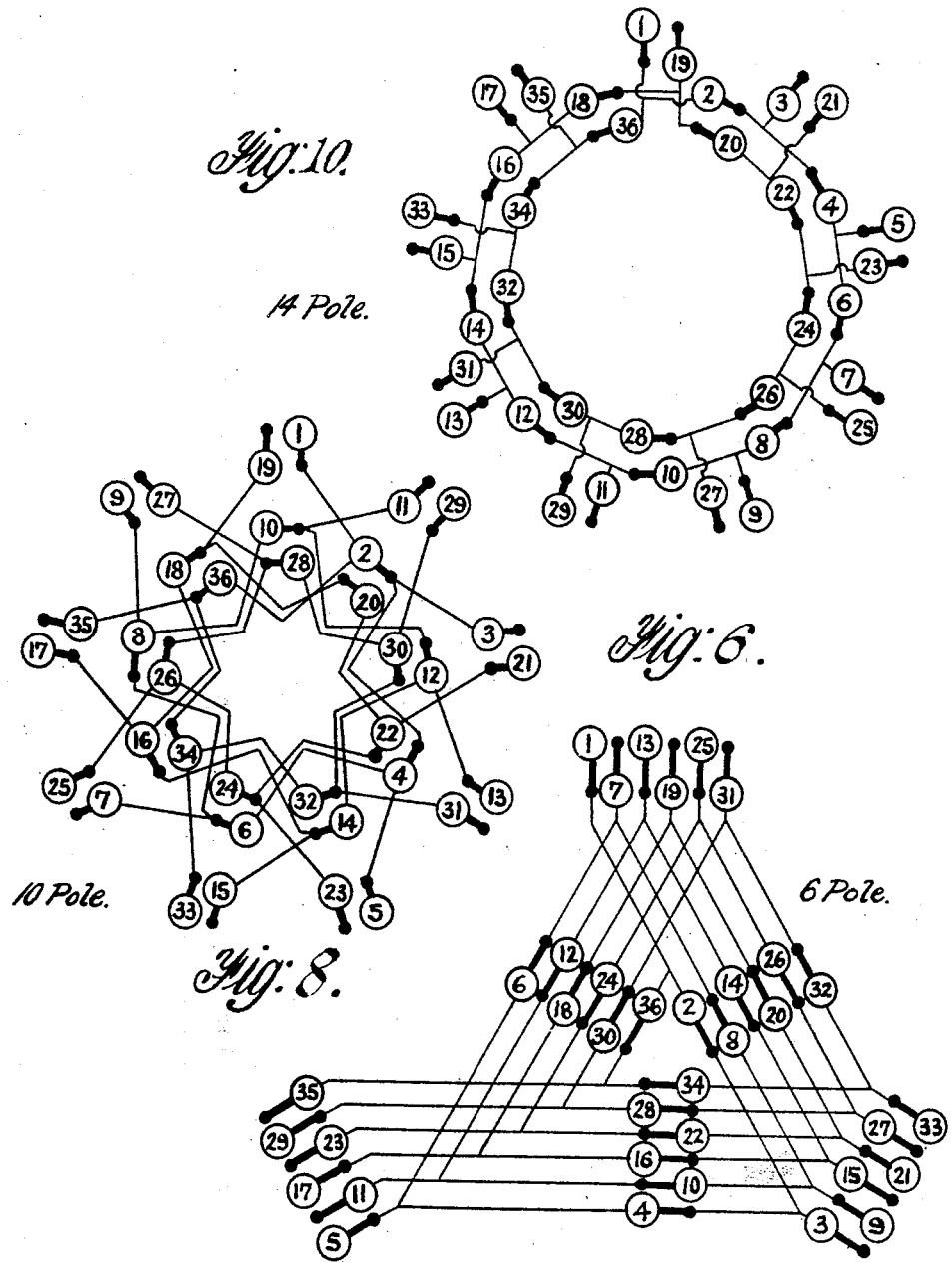

12 Pole.

8 Pole.

May 5, 1925.

F. CREEDY 1,536,077

DYNAMO ELECTRIC MACHINE

Filed July 30, 1921

8 Pole.
16 Pole.

10 Pole.
14 Pole.

INVENTOR.
Frederick Creedy.
by A. E. Odell
Attorney.

May 5, 1925.

F. CREEDY 1,536,077

DYNAMO ELECTRIC MACHINE

Filed July 30, 1921    7 Sheets-Sheet 6

8 Pole.

INVENTOR
Frederick Creedy.
by A. E. Dull
Attorney.

May 5, 1925.
F. CREEDY
1,536,077
DYNAMO ELECTRIC MACHINE
Filed July 30, 1921     7 Sheets-Sheet 7
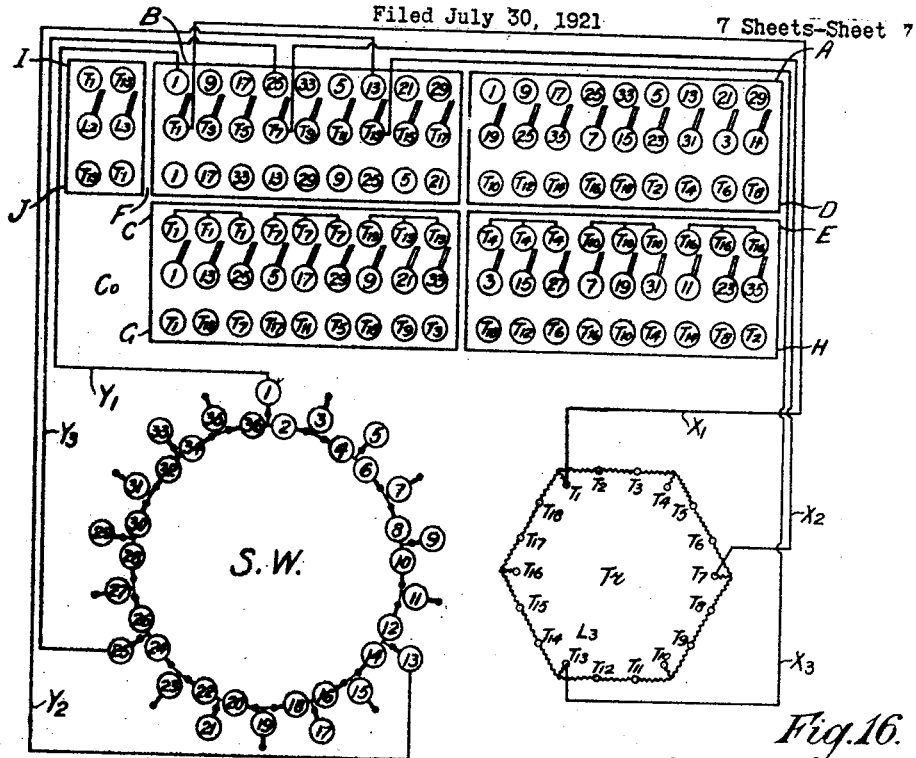
Fig.16.
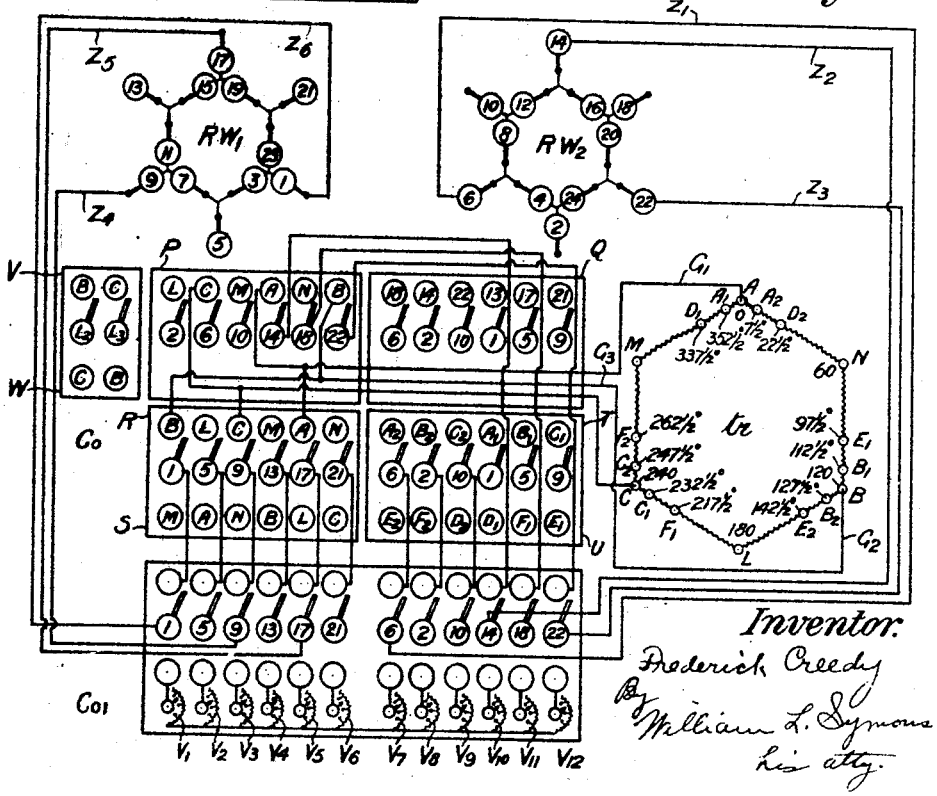
Inventor.
Frederick Creedy
By William L. Symons
his atty.

Patented May 5, 1925.

1,536,077

UNITED STATES PATENT OFFICE.

FREDERICK CREEDY, OF ILKLEY, ENGLAND.

DYNAMO-ELECTRIC MACHINE.

Application filed July 30, 1921. Serial No. 488,687.

*To all whom it may concern:*

Be it known that I, FREDERICK CREEDY, a subject of the King of Great Britain and Ireland, and a resident of 10 Ashburn Place, Ilkley, Yorkshire, England, have invented certain new and useful Improvements in Dynamo-Electric Machines (on which application has been made for Letters Patent in Great Britain, No. 23,123, filed 5th August, 1920; No. 36,540, filed 30th December, 1920), of which the following is a specification.

This invention relates to windings for dynamo electric machines which require to operate on fields of more than one pole number. Examples of such machines are the variable pole machines described in my former Patent No. 1291424 and my application Serial No. 276263 filed Feb. 11th, 1919; other examples are the now well known internal cascade machines which combine upon one carcase the windings or the equivalent of the windings of two cascade connected machines; various developments of such machines are described in my co-pending application of even date with this.

The purpose of the invention is to provide windings of simple form capable of use upon a plurality of pole numbers. More specific purposes of the invention are to provide windings capable of use as primary windings on one or more pole numbers and simultaneously as secondary windings on another or others; or capable of use as secondary windings upon two or more pole numbers, and of resistance control upon one or more of them.

With these purposes in view, my invention includes windings connected to form one or more star-mesh networks, one half of the sections being connected in star to the junctions of a mesh formed of the remaining sections. My invention contemplates a winding of this kind capable of use as a primary winding upon a plurality of pole numbers, the change in pole number requiring no changes in the connections of the sections of the winding among themselves other than such as result from changes of the connections between the terminals and supply phases. My invention, further, and more specifically includes a star-mesh network, in which alternate sections form the mesh (or meshes), and alternate sections in the mesh are mutually reversed, while also alternate sections in the star are mutually reversed. Moreover in its fullest embodiment my invention includes a dynamo electric machine having a winding of this kind upon one or both of its numbers and equipped with the simple control apparatus necessary to bring about desired changes of pole member or resistance control. The term "section" employed in the present specification is to be understood to mean one or several coils of the winding joined in series, this coil or coils lying in a pair or several pairs of slots.

In the accompanying drawings,

Figure 5 shows another such winding together with the supply and control apparatus requisite for variable pole working.

Figures 6 to 10 explain the use of this winding and the effect of its control apparatus.

Figure 11:
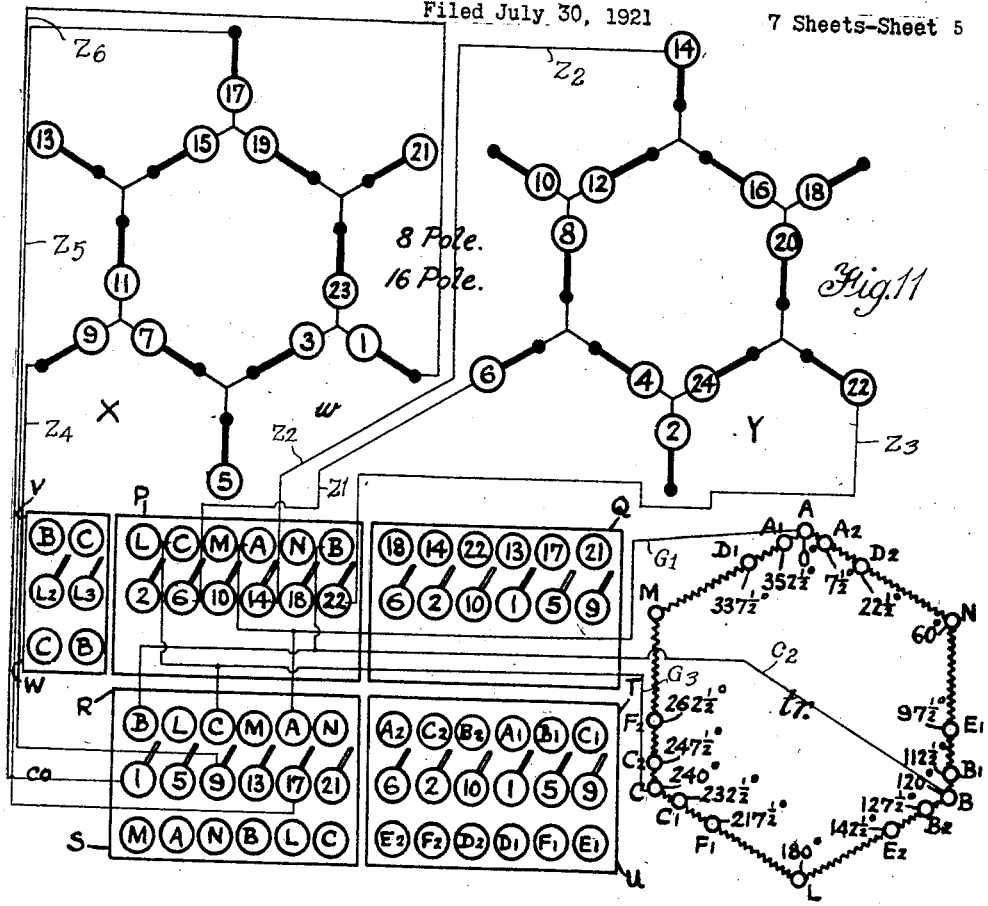

Figure 11 shows yet another such winding with supply and control apparatus.

Figure 12:
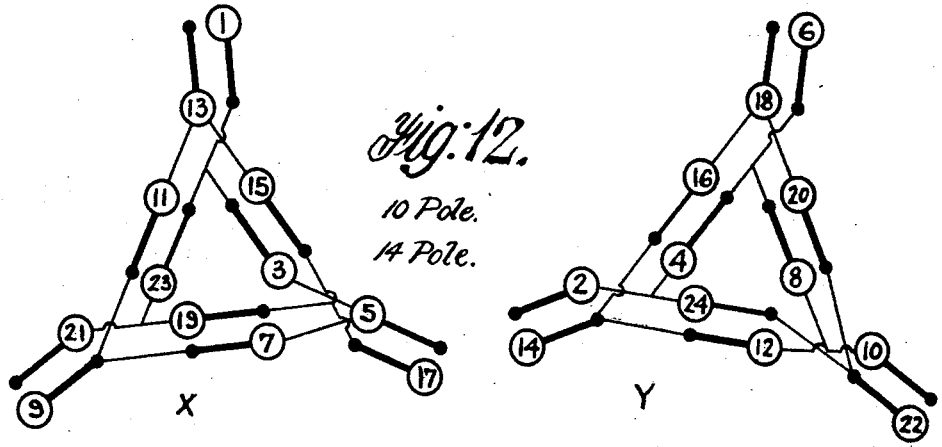

Figure 12 further illustrates the effect of its control apparatus.

Figure 13:
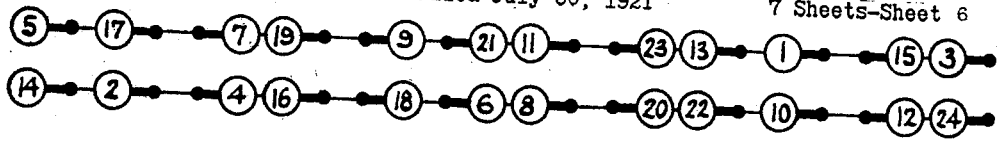
Figure 14:
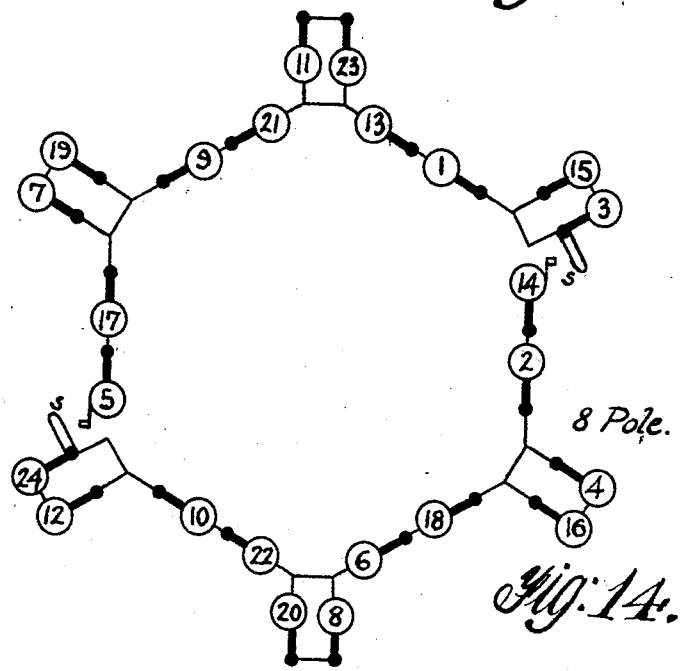
Figure 15:
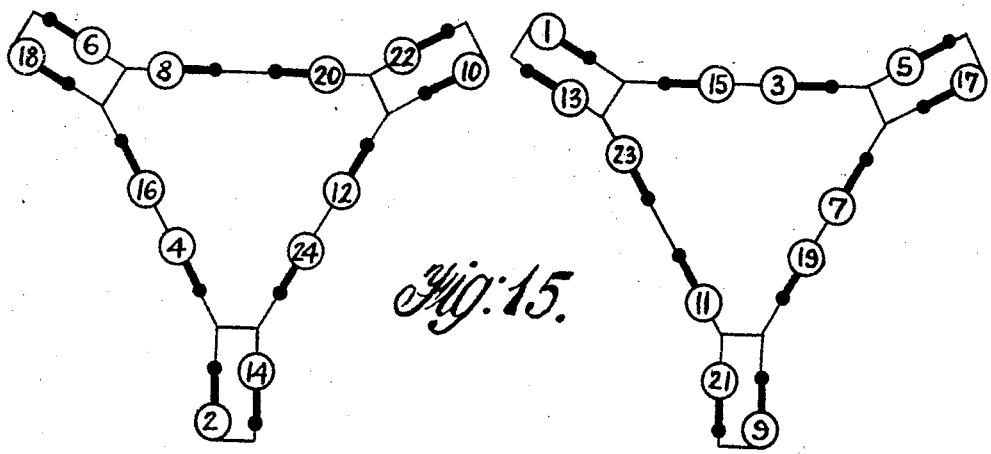

Figures 13 to 15 similarly illustrate another class of winding typical of my invention. Figure 16 shows the stator and rotor windings of a six speed motor.

In my Patent No. 1291424 I have shown how a simple star-connected or mesh-connected winding may be caused to produce any one of a number of pole numbers by the application of E. M. F.'s of appropriate phase to its terminals. In my application Serial No. 276263 I have shown how a star-mesh connection of the sections of a winding may be used to produce in the winding a greater number of phases than that of the external supply. I have now found that if the star-mesh winding be built up by combining the sections in certain definite ways further explained hereinafter, the winding will serve as a primary winding on any pole number whatever, except a pole number which is equal to half the number of sections, provided the number of sections is sufficient to keep the phase difference between neighbouring sections within the limit discussed in my specification Serial No. 359311 filed February 17th, 1920.

Figure 1:
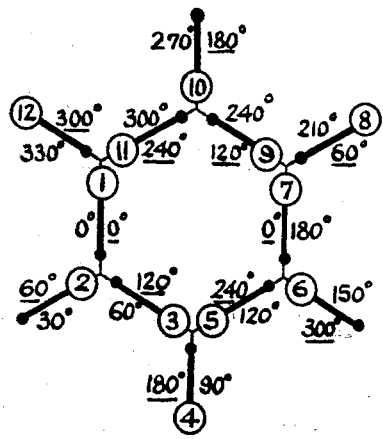
Figures 1 to 4 represent and explain a winding typical of my invention, together with certain modifications thereof.

Figure 1 shows a winding of 12 sections built in the manner in question, and adapted to produce 2, 4, or 8 poles without change in the connections of its sections illustrated. The sections are supposed numbered consecutively around the circumference, and the number of each section is indicated in the circle which represents, say, the beginning of the section proceeding clockwise around the machine. It will be seen that alternate sections are connected into a mesh, and the remaining sections are connected as star rays to the angles of the mesh; further, alternate sections of the mesh are reversed, and so are alternate sections of the star; and finally where the beginnings of two mesh sections are joined together, the end of the intervening star section is joined to them, while where the ends of two mesh sections join, the beginning of the intervening star section is joined in them.

Figure 2:
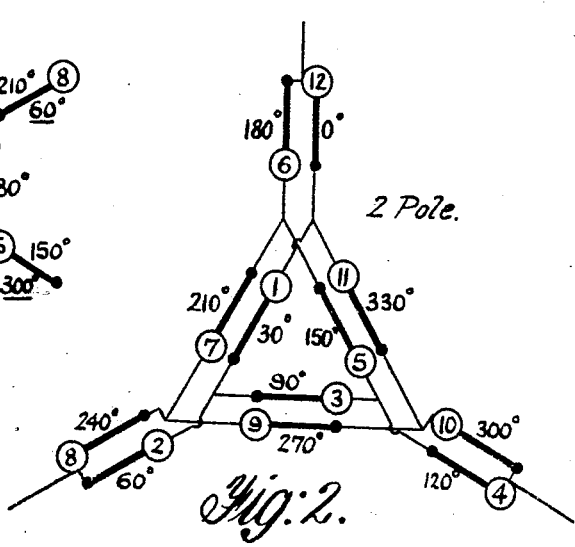

In the figure the sections are marked with the phase angles they must have if the winding is to produce 2 poles; and they are also marked, with the figures underlined, with the phase angles appropriate to 4 poles. Since it makes no difference to the operation of the winding if the phase of all its sections is changed by the same amount, it is clear that the 2 pole arrangement does not require any different phases of supply from the 4 pole arrangement, for if 30° be added to its phase angles those of the star sections become the same as, or opposite to, one or other of the supply phases for 4 poles. This is more readily seen from Figure 2 which shows the phases of the sections for 2 poles, section 1 being changed in phase 30° as compared with its 4 pole condition. Figure 2 (and Figure 1 for the 4 pole condition) represents by the direction in which its sections are drawn the phase of the E. M. F. in the sections; and use is made of this graphic representation of the phase angles in most of the figures described below.

On 6 poles alternate star sections are in opposition of phase; in other words when producing this pole number the winding admits only of single phase excitation and gives the machine the properties of a single phase induction motor rather than of a polyphase induction motor. This is true of any winding connected in this manner for a pole number equal to half its number of sections; so that for many purposes it is not convenient to employ the winding on this pole number.

Figure 3:
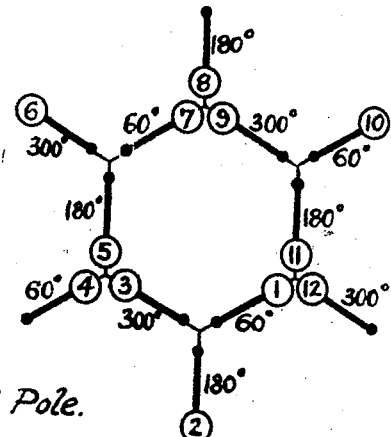
Figure 4:
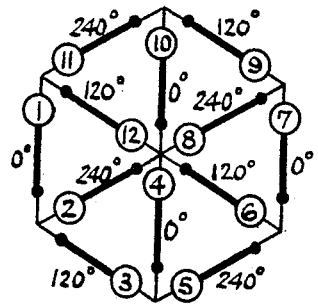

Figure 3 represents a 12 section winding on 8 poles. As compared with Figure 1 the star sections are reversed. But it is not necessary to change the connections of the winding to secure this effect. Figure 4 shows the same phases in the sections, and is arrived at from Figure 1 merely by short-circuiting the star terminals leaving the mesh angles to be connected to the supply.

This illustrates another general property of these windings; they may be changed from a given pole number less than half the number of sections, to another pole number as much greater than half the number of sections as the first was less, by reversal of half the sections. The substitution of the Figure 4 arrangement for that of Figure 3 can only be thus simply effected for a 12 section winding, since it depends on the fact that the radius to the angle of the hexagon is equal to its side, which is not the case with other polygons.

For reasons of economy in the number of supply phases needed, and also where a winding is to serve as a secondary on one pole number in addition to acting as a primary on another, it is often an advantage if several terminals of the winding are connected to the same phase of supply; as the terminals of the 2 pole winding of Figure 1 are connected in pairs in Figure 2. The number of terminals connected together is the common factor of $n$ and $$\left(\frac{n}{2}-p\right),$$

where $n$ is the number of star sections and $p$ the number of pole pairs. From the characteristics of the winding already set forth it is apparent that the number of sections must be divisible by 4, i. e., $n$ must be even. If $\frac{n}{2}$ is odd, then whenever $p$ is also odd $$\left(\frac{n}{p}-p\right)$$

is even and will have a common factor with $n$ of at least 2; i. e., on odd numbers of pole pairs the terminals will be connected at least in pairs. There are then sometimes four times as many different phases in the sections of the winding as there are in the supply. If $\frac{n}{2}$ is even then the terminals will be connected in pairs on even numbers of pole pairs.

It will be noted that the phase relationship between the current and the E. M. F. in each section is the same.

As an example of the use of this type of winding for variable pole working, Figure 5 shows a winding W of 36 sections, together with the transformer Tr and a controller Co necessary to enable it when supplied from three-phase mains to produce 6, 8, 10, 12, 14 or 16 poles. The supply mains are connected to the alternate angles L¹, L², L³, of the transformer. The controller consists of four 9-pole two-way switches, and one 2-pole two-way switch. The contacts and knife blades of the switches are connected to the tappings of the transformer or the sections of the winding whose numbers they bear. Most of the connections are omitted for simplicity but as an example $X^1$, $X^2$, $X^3$ show typical connections from the transformer $Tr$ to the controller $Co$ and $Y^1$, $Y^2$, $Y^3$ typical connections from the controller $Co$ to the section terminals of the motor winding. The two-pole switch serves to reverse the order of connection of the supply mains to the transformer, and in conjunction with the other four switches brings about the changes in the phase of the sections shown in Figures 5 to 10, in which figures the direction in which each section is drawn represents its phase as above explained. The two positions of the respective switches are indicated by the letters A—J respectively. If A, C and I alone are closed the winding has the phases shown in Figure 6, it has 6 parallels and produces 6 poles. If B, D and J are closed the winding is connected as in Figure 7 and gives 8 poles. If A, B and I are closed, the winding is connected as in Figure 8, has two parallels and produces 10 poles. If C, E, and J are closed the winding has the phases shown in Figure 9, has three parallels and produces 12 poles. If A, F and I are closed the winding has the phases indicated in Figure 14, has two parallels and produces 14 poles. Finally if switches G, H, and I are closed the phases of the winding are those shown in Figure 5 and the winding produces 16 poles. Examination of the figures will show that in all of them the winding retains the connections between its sections shown in Figure 5; it is only the connections to the supply that are changed, though obviously the connection of two or more sections to the same phases of the supply may also be regarded as a new connection in the winding.

It will be noted that for 8 poles 18 supply phases are required, and a less number may be employed for certain other pole numbers. For this reason a transformer $Tr$ is used capable of transforming a three phase into an 18-phase supply. The design of transformers for such phase multiplication has been described in my specification Serial No. 276263.

That specification points out, also, that the voltage applied to each section of the winding on its different pole numbers ought to decrease as the corresponding speed of the machine decreases, and that consequently the lower the speed the greater should be the number of sections between terminals of the supply. It will be seen that this desideratum is largely secured in the arrangement of Figure 5, for on 6 poles there are three sections between, say, line terminals $L^1$ and $L^2$, while on 12 poles there are four, and on 14 poles approximately five.

Naturally the controller and transformer of Figure 5 may be simplified if not all the pole numbers described are required. For instance, if only 6 and 12 poles are required, the sections shown joined in parallel on 12 poles may be permanently connected together, and the controller need only effect connections between diametrically opposite points of the 12 pole diagram to bring about the production of 6 poles. Similarly if 6, 10 and 14 poles alone are required, the terminals which are connected on the 10 and 14 pole diagrams may be connected permanently, and if the controller is arranged to join these terminals together in sets of three spaced evenly around the circumference it will produce the 6 pole connection. Comparison of the diagrams for 8 and 10 poles shows that terminals 1, 9, 17, 25, 5, 13, 21, 29, occur in the same order on both pole numbers reading clockwise on 8 pole and counter-clockwise on 10 pole. Hence, switch B by which these terminals are connected to evenly spaced supply phases may remain closed for both of these pole numbers, the necessary change of phases being effected by throwing over the two pole switch from J to I so reversing the direction of rotation of the flux. This is because on numbers of poles spaced equally above and below $\frac{1}{4}$ of the number of sections the same phases of supply are required at alternate terminals but taken clockwise for the one pole number and anti-clockwise for the other.

All these pole numbers except 12 poles may be produced by a winding of 24 sections. Other numbers of sections are also possible; but if the ultimate supply is three-phase it is of advantage to use numbers of section divisible by three. Figure 11 shows a winding $w$ of 24 sections with its supply transformer $Tr$ and controller $Co$. It will be seen that the winding consists of two completely independent star mesh networks, each like that of Figure 3, and each capable of connection in parallels like Figure 2. The transformer is required to give six evenly spaced phases, and in addition, phases displaced $7\frac{1}{2}°$ and $22\frac{1}{2}°$ on each side of three of these six phases. The controller comprises two 6-pole one-way switches P and Q, and two 6-pole two-way switches R, S and T, U, together with a two-pole two-way reversing switch V, W.

The contacts and plates of the switches are connected to the tappings of the transformer and the sections of the windings whose reference numbers and letters they bear. Most of the connections are omitted for simplicity, but as an example $G^1$, $G^2$, $G^3$ show typical connections from the transformer $Tr$ to the controller $Co$ and $Z^1$, $Z^2$, $Z^3$, $Z^4$, $Z^5$, $Z^6$ show typical connections from the controller switch $Co$ to section terminals of the motor winding.

On 8 poles P, R and V are closed, and on 16 poles P, S, and W. For both of these pole numbers the condition of the winding is represented by Figure 11; the connections of one half of the winding, the part X of Figure 11, are unchanged, except for the reversal of order of the phases due to the throwing over of the two-pole switch from V to W; the phases of the other half, Y, are exactly reversed.

On 14 poles Q, T and V are closed, and on 10 poles Q, U and V. Switch Q joins together opposite terminals in both parts of the winding; while the change from T to U alters the phase difference between corresponding sections of the two parts from 15° to 195°. The condition of the winding on both pole numbers is as shown in Figure 12, but the phases of the one part are shifted with respect to those of the other. It will be understood that the directions of the lines representing the sections of the windings constitutes an indication of the phase of the E. M. F.'s, and also of the currents, in such sections. Thus, for example, in Fig. 11 the phase of the E. M. F. in the section numbered 17 may be considered to be zero, whereas, when the winding is connected in the manner illustrated in Fig. 12 the E. M. F. in the section 17 is of phase 112½°. This is indicated by the direction of the line representing the section 17 in Fig. 12.

Another star-mesh connection serving the same purpose is shown for 24 sections in Figures 13-15, the sections are connected in two groups, the odd sections forming one group and the even sections the other, as shown in Figure 13. Within each group pairs of opposite sections are connected in series, but in alternate pairs the sections of the pair are mutually reversed. It will be clear that the arrangement of Figure 13 can be extended to any number of sections divisible by eight; so that the 24-section winding shown is typical of a class of windings.

Figure 14 shows the connections of this winding for producing 8 poles (save that two switches s, s are shown open for prominence). The two groups of sections are joined in series, and the pairs of sections in opposition in the drawing of Fig. 13 form star arms connected to the junctions of a mesh composed of the remaining pairs. For 10 poles each group is closed upon itself as shown in Figure 15, and the pairs in which the sections are not mutually reversed in the drawing of Fig. 13 form the star arms. To effect this change the switches s, s are operated to connect the sections 24 and 14 and the sections 3 and 5.

As has been shown in my former specifications, it is easy to determine the phases which the sections of a winding require to have upon any particular pole number. There can then be no difficulty in constructing a controller which will connect the sections to the requisite phases. But in general such a controller might be very complicated if advantage were not taken, as in the two instances described, of such symmetry in the phase changes as may occur on the particular set of pole numbers required. Such possible simplification may be readily deduced in the light of the following general rule governing the phase changes.

If the winding comprises $r$ equally spaced groups of P+Q sections each, the relative phases of the sections in each group will be the same on P pole pairs and Q pole pairs. The relation between their actual phases may be expressed by saying that for Q pole pairs as compared with P pole pairs each group is "reversed" round one of a set of $r$ equally spaced axes, of which the first, round which group 1 is reversed, passes through section 1 of that group, and those round which the remaining groups are reversed are to be taken in the same order as the groups i. e. group 2 reverses about an axis differing $\frac{\pi}{r}$ in position in space from the first axis, group 3 about one differing $2\frac{\pi}{r}$ winding $n$ round one differing $\frac{(n-1)\pi}{r}$. The statement that a group of sections is "reversed" about a particular axis in space in changing from P pole pairs to Q pole pairs, the relative phases of its sections remaining unaltered, is meant that any section distant by a given amount in a clockwise direction on P pole pairs has the same phase as a section distant by the same amount in a counter-clockwise direction on Q pole pairs.

It has been shown that the star mesh winding can be used as a primary winding on any one of several pole numbers. The winding acts as a cascade winding if alternate star terminals are short-circuited and the remainder left on open circuit, as is more fully explained in my application of even date herewith; and the connection of these open-circuit terminals, for instance through resistances, is a useful means of bringing a cascade motor up to a basal speed. The motor may be brought up to its cascade speed with half the terminals open-circuited, by connecting resistances across tappings in the primary winding of the machine; but, instead, the terminals of the secondary which require to be short-circuited on the cascade speed may for starting be connected through variable resistances. If the motor is also required to rise to a basal speed, a single set of slip rings and resistances may be employed, together with a switch upon the rotor which for running up to cascade speed connects to the slip rings the terminals that have to be short-circuited for cascade running, and which short-circuits those terminals and instead of them connects to the slip rings the alternate star terminals for running on cascade speed and in readiness for running up to a basal speed.

Figure 9:
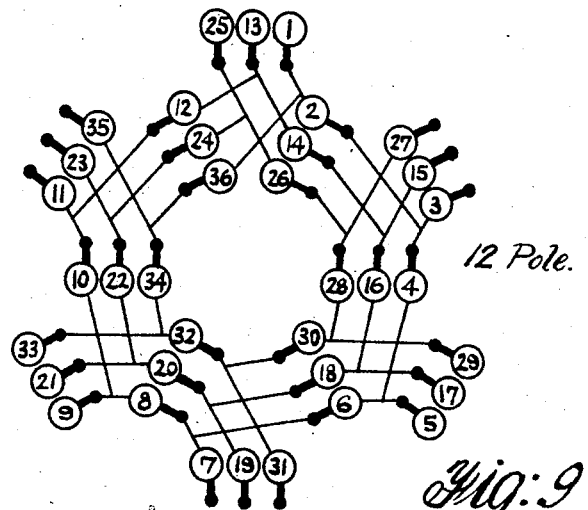

But, in addition, whenever the terminals of a star mesh winding are connected together in pairs or in larger sets as in Figure 6 or 9, the winding will act simultaneously as a primary on one pole number and as a secondary on another. For instance, the 6-pole connection of Figure 6 admits of 10-pole secondary currents circulating in the circuits which are closed by the junction of the terminals in sets of six, that is by joining the ends of the sections 1, 7, 13, 19, 25, 31, the ends of the sections 33, 27, 21, 15, 9, 3 and the ends of the sections 5, 11, 17, 23, 29, 35; so that this winding could serve, for instance, as the primary of an internal cascade motor producing six poles and acting as a secondary on 10 poles.

Figure 7:
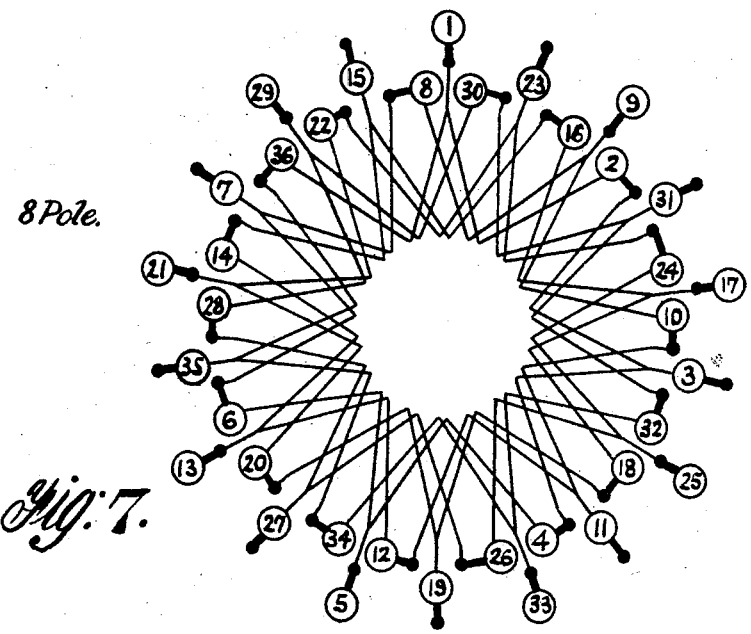

Further, if the star mesh winding is used only as a secondary it will serve as a short-circuited secondary on one pole number and enable resistance control on another. For instance, if the terminals of Figure 6 are permanently connected in sets of six, and resistances are joined between the three terminals thus formed, the winding gives resistance control when acting as a secondary on 6 poles, and on other pole numbers acts as a short-circuited secondary. So a motor might be built with a primary winding capable of giving say 6 and 8 poles, which primary might itself be such a winding as is shown in Figures 6 and 7, and with a secondary as just described; and it could be brought up to its 8 pole speed by connecting the primary for 6 poles and running up on resistances, and when the 8-pole speed was reached changing the primary to its 8 pole connection would cause the machine to continue running at 8-pole speed with short-circuited secondary. It is obvious the principle can be extended to a motor with several speeds, for instance, to one with a primary winding and controller capable of all the connections of Figures 5 to 10; and it offers a convenient means of passing from one speed to another without shock.

Finally a comparison of Figures 1 and 3 shows that the provision of a switch for reversing the star sections with respect to the mesh sections adds considerably to the number of pole numbers upon which one of these windings will serve. For instance, the winding of Figure 5 has enough sections to admit of the production of 24 poles without the phase difference between neighbouring sections exceeding 120°. Therefore, the addition to the control apparatus of that figure of switches for reversing the star sections with respect to the mesh would enable the production of all pole numbers from 6 to 24 except 18. Save for the reversal of the star sections the connections for 20 poles would be the same as for 16, for 22 poles the same as for 14, and so on.

It will be obvious that the complete embodiment of my invention is a dynamo electric machine bearing one or more of such windings as have been described upon one or both of its members. As a specific instance, Figure 16 shows the windings of one form of motor according to the present invention.

The motor has a winding on the stator SW of 36 sections. $Tr$ is the transformer and $Co$ the controller to enable the winding when supplied from three phase mains, to produce 6, 8, 10, 12, 14 or 16 poles. Most of the connections are omitted but $X^1$, $X^2$, $X^3$ show typical connections from the transformer $Tr$ to the controller $Co$, and $Y^1$, $Y^2$, $Y^3$ show typical connections from the controller $Co$ to the section terminals of the motor winding. The winding SW is of the form illustrated in Fig. 5 of the drawings and has been fully described with reference to said figure. The rotor winding comprises two completely independent star mesh networks $RW^1$ and $RW^2$. The winding has 24 sections, and is of the form illustrated in Fig. 11 of the drawings which has been fully described above. To enable this winding to be used as a secondary, control apparatus must be provided for connecting together directly or through resistances the terminals of the winding. $Co^1$ is a switch provided for this purpose in combination with the controller $Co$. The resistances are lettered $V^1$, $V^2$, $V^3$, $V^4$, $V^5$, $V^6$, $V^7$, $V^8$, $V^9$, $V^{10}$, $V^{11}$, $V^{12}$, and the switch is so arranged that the winding may be connected to the transformer $Tr$ when it is to be employed as a primary or its terminals may be short circuited through the resistances $V^1$, $V^2$, $V^3$, $V^4$, $V^5$, $V^6$, $V^7$, $V^8$, $V^9$, $V^{10}$, $V^{11}$, $V^{12}$, or directly connected together when it is employed as a secondary. The connections of the star sections to the switch $Co^1$ are shown in the conventional way $Z^1$, $Z^2$, $Z^3$, $Z^4$, $Z^5$ and $Z^6$ showing typical connections.

The motor is arranged to run on 6, 8, 10, 12, 14 and 16 poles, the stator winding SW producing these. The star mesh winding on the rotor acts as a secondary on these pole numbers.

By operating the controller $Co$ for the stator winding as indicated in the figure, the connections are obtained to produce the necessary arrangement of the stator windings for the motor to run on any of the speeds mentioned; the amount of resistance connected into the rotor winding $RW^1$, $RW^2$ will be varied as required. For example, to produce 8 poles the switches B, D and J are closed, and to produce 16 poles the switches G, H and I are closed as is described with reference to Figure 5 of the accompanying drawings.

The winding RW¹, RW² may be used as a primary by operating the switch Co¹ to connect the winding through the controller Co to the supply, as has been described above.

What I claim is:—

1. In an alternating current dynamo electric machine comprising a stator member and rotor member, a winding on one of said members to be energized from a polyphase supply and so disposed as to generate E. M. F.'s of a number of phases greater than the number of phases in the supply and in which the phase relationship between the current and the E. M. F. in each section is the same, and means to connect said winding in a plurality of ways to operate with a plurality of fields of different numbers of poles without changes in the connections of the sections of the winding among themselves.

2. In an alternating current dynamo electric machine comprising a stator member and rotor member a winding on one of said members to be energized from a polyphase supply and so disposed as to generate E. M. F.'s of a number of phases greater than the number of phases in the supply, said winding having half its sections connected in mesh, the remaining sections connected in star to the junctions of mesh sections, alternate sections of the mesh mutually reversed and alternate sections of the star mutually reversed and means to connect said winding in a plurality of ways to operate with a plurality of fields of different numbers of poles without changes in the connections of the sections among themselves.

3. In an alternating current dynamo electric machine comprising a stator member and rotor member, a winding on one of said members to be energized from a polyphase supply and so disposed as to generate E. M. F.'s of a number of phases greater than the number of phases in the supply, said winding having half its sections connected in mesh, the remaining sections connected in star to the junctions of mesh sections, alternate sections of the mesh mutually reversed and alternate sections of the star mutually reversed and means to connect said winding in a plurality of ways to operate with a plurality of fields of different numbers of poles without changes in the connections of the sections among themselves, the number of star connected sections having a common factor with the difference between half of said number and each of the number of pole pairs produced by the winding, said common factor being not less than two.

4. In an alternating current dynamo electric machine comprising a stator member and rotor member, a winding on one of said members to be energized from a polyphase supply and so disposed as to generate E. M. F.'s of a number of phases greater than the number of phases in the supply, said winding having alternate sections connected in mesh, the remaining sections connected in star to the junctions of the mesh sections and means to connect said winding in a plurality of ways to operate with a plurality of fields of different numbers of poles without changes in the connections of the sections among themselves, and so that the number of sections in series between the terminals of the winding having approximately a given phase difference is less as the number of poles in the field produced by it is less.

5. In an alternating current dynamo electric machine comprising a stator member and rotor member, a winding on one of said members to be energized from a polyphase supply, comprising a plurality of independent sets of sections, each set of sections being permanently interconnected so that the number of phases produced in it will be greater than the number of terminals of the set, while the pole number of the winding is changed by changing the phases of the sets without changing the connections of the sections within the set.

6. In an alternating current dynamo electric machine comprising a stator and rotor, a primary winding having alternate sections connected in mesh and the remaining sections connected in star to the angles of the mesh, with means for joining the star terminals together in sets and to supply phases whereby the winding will produce a field of one pole number and act as a secondary on a field of another pole number without changing the connections of the sections within the sets.

7. In an alternating current dynamo electric machine comprising a stator member and rotor member, a plurality of windings on one of said members to be energized from a polyphase supply and each so disposed as to generate E. M. F.'s of a number of phases greater than the number of phases in the supply and means to connect said windings in a plurality of ways to operate with a plurality of fields of different numbers of poles without changes in the connections of the sections of the windings among themselves.

8. In an alternating current dynamo electric machine, comprising a stator member and rotor member, a plurality of windings on one of said members to be energized from a polyphase supply and each so disposed as to generate E. M. F.'s of a number of phases greater than the number of phases in the supply, sequential sections of winding around the periphery of the member constituting parts of different windings, alternate sections of each winding being connected in mesh the remaining sections connected in star to the junctions of the mesh sections and means to connect said windings in a plurality of ways to operate with a plurality of fields of different numbers of poles without changes in the connections of the sections among themselves.

9. An alternating current dynamo electric machine comprising a stator member and rotor member, a winding on one of said members to be connected to a polyphase supply and so disposed as to generate E. M. F.'s of a number of phases greater than the number of phases in the supply, said winding having half its sections connected in mesh, the remaining sections connected in star to the junctions of mesh sections, alternate sections of the mesh mutually reversed and alternate sections of the star mutually reversed, means to connect said winding to the supply in a plurality of ways to produce a plurality of fields of different numbers of poles without changes in the connections of the sections among themselves, and a winding on the other member adapted to act as a secondary in the fields produced by the winding on the first mentioned member.

10. An alternating current dynamo electric machine comprising a stator member and rotor member, a winding on one of said members to be connected to a polyphase supply and so disposed as to generate E. M. F.'s of a number of phases greater than the number of phases in the supply, said winding having alternate sections connected into a mesh of an even number of sides exceeding six, the remaining sections connected in star to the junctions of the mesh sections, said star sections including a different number of turns than said mesh sections, means to connect said winding in a plurality of ways to produce a plurality of fields of different numbers of poles without changes in the connections of the sections among themselves, and a winding on the other member adapted to act as a secondary in the fields produced by the winding on the first mentioned member.

11. An alternating current dynamo electric machine comprising a stator member and rotor member, a winding on one of said members to be connected to a polyphase supply and so disposed as to generate E. M. F.'s of a number of phases greater than the number of phases in the supply, said winding having half its sections connected in mesh, the remaining sections connected in star to the junctions of mesh sections, alternate sections of the mesh mutually reversed and alternate sections of the star mutually reversed, means to connect said winding to the supply in a plurality of ways to produce a plurality of fields of different numbers of poles without changes in the connections of the sections among themselves, and a plurality of windings on the other member, each comprising a star mesh network, sequential sections of winding around the periphery of the member constituting parts of different networks, alternate sections of each network being connected in mesh and the remaining sections in star with the junctions of the mesh and means for connecting said star sections to enable the windings to act as secondaries in the fields produced by the windings on the first mentioned member.

12. In a variable pole alternating current dynamo electric machine comprising a stator member and rotor member, a winding on one of said members in which alternate sections are connected in mesh and the remaining sections in star to the angles of the mesh, said winding being arranged to act as a secondary upon a plurality of pole numbers and means whereby resistance may be inserted in the circuit thereof for control on one pole number.

In witness whereof I have signed my name to this specification.

FREDERICK CREEDY.